United States Patent [19]

Klein

[11] 3,783,171

[45] Jan. 1, 1974

[54] SILICA BRICKS
[75] Inventor: Walter Klein, Duisburg-Rahm, Germany
[73] Assignee: Didier-Werke A.G., Wiesbaden, Germany
[22] Filed: Nov. 15, 1971
[21] Appl. No.: 198,980

[30] Foreign Application Priority Data
Nov. 14, 1970  Germany.................. P 20 56 120.0

[52] U.S. Cl...................................... 13/35, 106/69
[51] Int. Cl............................................. F27d 1/06
[58] Field of Search............................ 13/35; 106/69

[56] References Cited
UNITED STATES PATENTS
3,340,075   9/1967   Stoddard........................... 106/69 X Primary Examiner—Roy N. Envall, Jr.
Attorney—E. F. Wenderoth et al.

[57] ABSTRACT

An electric furnace in which at least the cover is lined with silica bricks impregnated with a material containing carbon which releases hydrocarbons when heated.

1 Claim, No Drawings

SILICA BRICKS

The invention relates to silica bricks especially for electric furnace covers, particularly for covers of oxygen-operated electric furnaces.

Electric furnace covers for the steel industry are generally lined with silica bricks. In this connection, because of the high temperatures prevailing, and of the considerable wear, the highest chemical purity is demanded of the bricks. In the main, in this instance, the wear of the silica bricks occurs through the formation, with the iron oxides originating from the furnace chamber, of a fused mass on the surface of the bricks and the melting thereof and the resultant dropping away from the cover. These wear conditions may be recognized by the fact that there is practically no formation of a cristobalite zone on the side of the bricks exposed to the fire. A cristobalite zone has favorable effects with silica bricks in other industrial furnaces because of its refractory properties.

The object of the present invention is to limit the melting of the bricks and thus to increase the life of electric furnace covers. This is achieved according to the invention through the use of silica bricks impregnated with a material containing carbon, which releases hydrocarbons when heated. A decrease of the rate of melting of the surface of the silica bricks occurs, it is thought, due to the presence of the material containing carbon. This effect can be attributed to the formation of a reducing protective atmosphere in the area of the brick surfaces, which reduces the iron oxides of the atmosphere of the electric furnace in the proximity of the bricks to metallic iron, which retards the tendency of the iron oxides to cause the formation of a fused layer on the surface of the bricks. Also it is probable that the fused mass on the surface of the bricks contains finely dispersed carbon, whereby iron oxides are also reduced and the formation of a fused mass is further retarded.

It is already known in principle to impregnate refractory bricks with material containing carbon to reduce the wear due to slag attack. The carbon-containing material present in the brick appears to prevent slag infiltration penetrating deeply into the brick material. Thus hardly any of the structural changes take place in the brick which would be expected if the slag-producing components penetrated into the deeper brick areas.

To avoid slag infiltration penetrating deeply into the bricks, magnesia bricks, bricks containing alumina and silica bricks have been impregnated with a carbon-containing material.

However, silica bricks containing carbon have not hitherto been used for electric furnace covers, since the art-skilled had to assume that steps to reduce slag infiltration with silica bricks, in those cases where wear takes place as a result of surface melting, could not contribute to an increase of the resistance. In addition, it was to be expected that with carbon-containing silica bricks, the carbon would burn out quickly on the hot brick surfaces and thus, its effect would be prematurely lost. There was also to be considered as a disadvantage the known fact that silica, in the presence of a material containing carbon is easily reduced and becomes volatile.

However, we have discovered, surprisingly, that when tar-impregnated silica bricks are used in electric furnace covers, it surprisingly happens that an impoverishment in the hot brick layer does not take place, unlike the case with conventional refractory carbon-containing bricks. It appears that the melting process occurs more quickly, but is checked by the carbon-containing material containing hydrocarbons.

Thus according to the present invention in an electric furnace at least the cover is lined with silica brick impregnated with a material which releases hydrocarbons when heated.

The impregnating material preferably contains hydrocarbon oil with boiling points grater than 300°C, e.g. al least 15 percent by weight of the said material is provided by such oils. The impregnating material may comprise a mixture of pitch, e.g. 50 to 85 percent or 95 percent by weight, especially about 80 percent and such oils, for example, it may be a tar.

The hydrocarbon oils may be anthracene oils. The impregnating material preferably comprises from 5 to 15 percent by weight of the impregnated brick.

A preferred form of silica brick in accordance with the present invention has its pores containing tar with about 80 percent pitch and at least 15 percent of anthracene oils boiling over 300°C. Excellent improvements in brick life are achieved when such bricks are used to build electric furnace covers. The exact composition of the impregnated and the proportion to be used will clearly vary depending on the particular impregnant and brick used, but in general it is expected that the ranges quoted will be most useful bearing in mind that when too low or too high a proportion of volatile hydrocarbon oils is used, the advantages of the invention will not be obtained. When too low a proportion is used, the bricks are not much better than the prior art and when too high a proportion is used, there is a tendency for coking to occur to a small extent.

It is advantageous for the silica bricks according to the invention to be impregnated as fully as possible and in gas-tight fashion with the impregnating material, by the known utilisation of vacuum and over pressure when impregnating.

The silica bricks for electric furnace covers, according to the invention, showed when tested, as compared with the silica bricks used hitherto, more uniform and improved fusion behavior as well as no premature or increased wear in the brick joints.

Impregnated silica bricks suitable for use in accordance with the present invention can be made as follows.

Conventional silica bricks having the following properties used as the starting material; $SiO_2$ content over 95 percent by weight, $H_2O_3$ content 0.7 percent by weight, weight by volume 1.90, specific weight 2.36, total porosity 19.5 percent by volume, open porosity 18.8 percent [1] cold compression strength 320 kg/sq. cm, Fire Resistance under pressure to DIN 51064 1680°C (ta value)

1. The pore distribution of the permeable pores was determined by the "Washburn" method in which water is expressed step wise from a water impregnated test specimen.

The permeable porosity was 8.3 percent by volume, 1.22 percent was made up from pores having a pore size in the range 3 to 10 microns, 4.40 percent in the range 10 to 30 microns, 1.45 percent in the range 30 to 50 microns and 1.26 percent in the range 50 to 75 microns.

Pore size is the dimension of the narrowest passage interconnecting adjacent pores, the water being expressed most easily from those pores which intercommunicate via large passages.

These bricks were then impregnated with tar (90 percent by weight pitch, softening point of the tar 50°C by the Kraemer-Sarnow method). The bricks were first exposed to a vacuum of 60 Torr then immersed under vacuum in the tar heated to about 200°C and then submitted to a pressure of 5 atmospheres for 15 minutes while immersed in the tar. The tar content of the impregnated bricks was about 9 percent.

It is thus preferred to use silica bricks with at least 95 percent $SiO_2$ a cold compression resistance of over 300 Kg/sq. cm, a porosity of less than 22 percent, a pore structure such that the permeable pores have pore sizes up to 80 microns with a predominant proportion of the pore sizes in the range from 10–40 microns. These bricks are preferably impregnated with pitch containing material, e.g. a tar rich in pitch using vacuum and over pressure to produce a brick containing 5 to 15 percent by weight of the impregnant. What we claim is:

1. A silica brick, the pores of which contain 5 to 15 percent by weight of tar, which tar comprises about 80 percent pitch and at least 15 percent of anthracene oils boiling over 300°C.